United States Patent
Neuberger et al.

(10) Patent No.: US 6,386,468 B1
(45) Date of Patent: May 14, 2002

(54) MECHANO-CHEMICAL FLOURINATION: IMPROVED METHOD OF FULLERENE FLUORINATION

(75) Inventors: Wolfgang Neuberger, F.T. Labuan (MY); Victor Kalinin; Andrei Alikhanyn, both of Moscow (RU)

(73) Assignee: CeramOptec Industries, Inc., East Longmeadow, MA (US)

( * ) Notice: Subject to any disclaimer, the term of this patent is extended or adjusted under 35 U.S.C. 154(b) by 0 days.

(21) Appl. No.: 09/450,633

(22) Filed: Nov. 29, 1999

(51) Int. Cl.$^7$ .............................................. B02C 19/12
(52) U.S. Cl. ............................ 241/18; 241/21; 241/23; 241/184
(58) Field of Search .......................... 241/175, 30, 23, 241/65, 21, 16, 22, 184, 18

(56) References Cited

U.S. PATENT DOCUMENTS

| | | |
|---|---|---|
| 5,382,719 A | 1/1995 | Fagan |
| 5,510,098 A | 4/1996 | Chow |
| 5,558,903 A | 9/1996 | Bhushan et al. |

OTHER PUBLICATIONS

T.S.Ivanova Et Al., "Mechanochemical synthesis of ammonia upon titanium dispersion.", Russian Chemical Bulletin, V.42 N1, Jan 1993.

"Effect of the mecano–activation of components on the physio–chemical properties of superconducting Yttrium Barium ceramics.", Dokl. Akad. Nauk. SSSR, 1989 V.306, Iss.6, 1409–1412. Russian.

Mark E. Vol'pin, "Self–assembling of associates of Amino Acids and Dipeptide Derivatives . . . ", Mendeleev Communications, 19995, 129–131.

R.C. Haddon Et Al., "Conducting films of c60 and C70 by alkali–metal doping", Nature,Mar. 28, 1991,V.350, 320–322.

Sumio Iijima, "Helical microtubules of graphitic carbon" , Nature, Nov. 7, 1991, V.354, 56–58.

Andrei A. Gakh Et Al., "Highly Fluorinated Fullerenes as Oxidizers and Fluorinating Agents.", Tetrahedron Letters, V34,N45, 7167–7170, Great Britain.

D.M. Cox Et Al., " X–ray Photoelectron and NMR Studies of Polyfluorinated C60: . . . ", J. Am. Chem. Soc. 1994, V116, 1115–1120.

John H. Holloway Et Al., "Fluorination of Buckminsterfullerene", J. Chem. Soc. Chem. Commun. 1991, 966–969.

I.P. Malkerova Et Al.,"Enthalpy of a Carbon–Halogen Bond in Fullerene Halides" C60Xn, Doklady Chemistry, V.342 1995, 142–146. Russian.

Krysztof Kniaz Et Al., " Fluorinated Fullerenes: Synthesis, Structure, and Properties", J.Am. Chem. Soc., V.115, N14 1993, 6060–6064.

Albert Tuinman Et Al., "Hyperfluorination of Buckminsterfullerene:Cracking the Sphere.", J.Am. Chem. Soc. 1993, 115,5885–5886.

A.S. Alikhanyan Et Al., "Synthesis and thermodynamic properties of Gaseous Fullerene C60 Fluorides", Russian Journal of Inorganic Chemistry V.40, N9, 1995, 1448–1454. Russian.

*Primary Examiner*—Mark Rosenbaum
(74) *Attorney, Agent, or Firm*—Bolesh J. Skutnik; BJ Associates

(57) ABSTRACT

A method of mechano-chemical fluorination is described that has a significantly improved yield over prior art methods of synthesis. The present invention illustrates this improved mechano-chemical Fluorination by describing the improved synthesis of Fullerene Fluorides (FF). This method overcomes reduced product yield that results from vibromill material corrosion. This method also overcomes the prior fluorination and FF synthesis problems of the prior art by utilizing different fluorinating materials, adding catalysts and diluting agents to the process, varying milling times, and heating in the presence of inert gasses to improve the fluorination process.

20 Claims, 1 Drawing Sheet

MECHANO-CHEMICAL FLOURINATION: IMPROVED METHOD OF FULLERENE FLUORINATION

BACKGROUND OF THE INVENTION

1. Field of the Invention

The present invention relates to mechano-chemical fluorination, specifically an improved method of fullerene fluorination.

2. Invention Disclosure Statement

Fullerene Fluorides (FF) are useful and can be employed in many fields. For example in the field of medicine they have been used in AIDS research. (Volpin M. E., Belavtzeva E. M., Romanova V. S., "Self assembling of associates of amino acids and dipeptide derivatives of 60 fullerene in aqueous solution." *Mendeleev Comm.* 1995 129–131.) They have also been used in the synthesis of super-conductive materials and to aid in the production of nanotubes. (Haddon R. C., Hebard M. J., *Nature.* 350 320 (1991); Lijima S. *Nature,* 354 56 (1991))

To produce FF in the prior art, several conventional prior art methods are used. For example, Fullerenes $C_{60}$ and $C_{70}$ are known to react with elemental fluorine and chlorine, as well as with $XeF_2$, $ClF_3$ to form fullerene halides. Fluorination of $C_{60}$ results in the formation of a mixture of compounds from $C_{60}F_2$ to $C_{60}F_{60}$. $C_{60}F_{48}$ is the major component of the mixture formed upon long-term fluorination. (Gahk A. A., Tuinman A. A. Adcock J. L. *Tetraedron Lett.* 34 (45), 7167–7170 (1993)) Fluorination of $C_{60}$, upon exposure to UV radiation has been reported. (Cox D. M., Cameron S. D., Tuinman A. A., *J. Am. Chem. Soc.* 116 (3), 1115–1120 (1994)) Fullerene Fluoride $C_{60}$ readily transfers into gas phase and can be identified by mass-spectrometry.

According to Halloway J. P., Hope E. J., Taylor R., *J. Chem. Soc. Chem. Comm.* 1991 (14), 966, fluorination of solid $C_{60}$ with gaseous fluorine at 70° C. for 12 days in Ni container leads to the formation of a white substance identified as $C_{60}F_{60}$. (Malkerova I. P., Secastianov A. S., Alikhanyan A. S., *Dokl. Acad. Nauk., Chemistry* (Russian). 342 (5), 630–634 (1995)) This can be identified using $^{19}F$ NMR and IR spectra with fluorine upon exposure UV radiation. (Tuinman A. A., Gakh A. A., Adkoc J. L. "Fluorinated Fulerenes" *J. Am. Chem. Soc.* 115 5885 (1993)) It is also possible to use $ClF_3$ as the fluorinating agent. (Alikhanyn A. S., Malkerova I. P., Sevastynov D. I. et all. *Zhurnal Neorgan. Khimii.* (Russian) 40 (9), 1502–1509 (1995)) These prior art methods however, are impractical and inefficient. Most techniques produce a low yield of the desired product. Another problem is that these techniques are too slow to be practical. An added problem with the production of FF is that it causes corrosion of materials and containers.

U.S. Pat. No. 5,558,903 describes a method to fabricate FF films that have an improved purity and adhesion to a substrate. A sublimation method is described for preparing fullerene coatings. The process is carried out in the presence of a substrate in a fluorine flow at 450–550° C. This invention describes the use of fullerene materials as very good lubricants. The drawback to the method described is that it produces very poor yields and low purity materials.

U.S. Pat. No. 5,382,719 describes a method to fabricate FF with fluorinate, CF straight chain hydrocarbon from 1 to 100 carbon atoms. Using this method, however, it is impossible to fabricate precise compositions such as $C_{60}F_{48}$, $C_{60}F_{36}$, or $C_{60}F_{18}$.

U.S. Pat. No. 5,510,098 describes a related method based on the CVD synthesis of doped fullerenes (including Ni, Rb, Cs, F, etc.) in large macroscopic quantities. This synthesis is relatively inexpensive and does not require the use of solid carbon materials such as graphite. Improved hot-filament-assisted chemical deposition method is used for the simultaneous deposition of diamond and fullerene on silicon substrates and other refractory metals such as W or Ta. This process creates diamond like films located in the central part of the substrate (substrate temperature ~900° C.), and fullerene soot located close to the substrate holder edge (500–700° C.). In this invention an example is given where the pressure used in this method is between 300–100 torr. Fullerene soot (5–20 mg) is collected for 5 hours. Some drawbacks to this method however, are that the yield is only around 1 mg/hour and that the obtained FF compositions are varied.

Conventional vibromilling is used in the synthesis of some materials such as $NH_3$ from environmental nitrogen (Ivanova T. P., Lipson A. G., Kutznetzov V. A. et all. "Mechano-chemical synthesis of ammonia upon titanium dispersion." *News from Russian Academy of Scientific. Series of Chemistry.* 42 (1), 237–238 (1993)) cement clinker at 700° C., and high temperature superconductor $YBa_2Cu_3O_7$ (Lipson A. G., Petrov S. V., Kutnetzov "Effect of the mechano-activation of components on the physio-chemical properties of super conducting Yttrium-barium ceramics" *V. A. Dokl. Report's Academy of Scientific USSR.* 306 (6), 1409–1412 (1989)) Conventional vibromilling however, has limited application to the synthesis of FF. FF synthesis causes prior art containers and milling balls to corrode and crack. This destruction of vibromilling materials decreases the quality of synthesis results. The present invention, however has overcome these deficiencies in FF synthesis.

BRIEF SUMMARY OF THE INVENTION

It is an object of the present invention to provide a method of mechano-chemical fluorination that has an increased yield.

It is also an object of the present invention to provide a method of mechano-chemical fluorination that reduces or eliminates corrosion and destruction of vibromilling materials.

It is another object of the present invention to illustrate a mechano-chemical method of synthesizing Fullerene Fluorides that is commercially practical.

Briefly stated the present invention provides a method of mechano-chemical fluorination that has a significantly improved yield over prior art methods of synthesis. The present invention illustrates this improved mechano-chemical Fluorination by describing the improved synthesis of Fullerene Fluorides (FF). This present method overcomes reduced product yield that results from vibromill material corrosion. This present method also overcomes the prior Fluorination and FF synthesis problems of the prior art by utilizing different fluorinating materials, adding catalysts and diluting agents to the process, varying milling times, and heating in the presence of inert gasses to improve the fluorination process.

The above, and other objects, features and advantages of the present invention will become apparent from the following description read in conjunction with the accompanying drawings.

BRIEF DESCRIPTION OF FIGURE(S)

DETAILED DESCRIPTION OF PREFERRED EMBODIMENTS

Chemical reactions can be triggered by the use of mechanical forces instead of thermo chemical activation. Mechano-chemistry has been used for the non-thermal low-temperature synthesis of many inorganic and organic compounds, molecular complexes and composite materials. In particular mechano-chemistry has been applied to the synthesis of fullerene compounds. The majority of mechano-chemical processes are pulsed so that a stress field will occur and relax with the pulse cycle. The typical method for mechano-chemistry processes has been done mainly by ball milling.

Mechano-chemical activation methods used in the prior art for synthesis of various materials have only limited uses due to some essential deficiencies. The use of conventional vibromilling methods for example, are limited by corrosion and cracking of the balls and containers used in milling. Other disadvantages of prior art methods are the extended amounts of time the synthesis process takes and the typically low yield and low purity of desired product. The present invention describes an improved method of mechano-chemical synthesis as exemplified with FF production. The present invention vibromilling method uses new types of balls, containers and fluorinating materials. The milling process itself is varied in time and temperature. This method uses varied fluorinating materials, catalysts, diluting substances, and inert gases during the heating stage. The protective coating on the containers and balls is possible through advances in coating application technology. (Lakhotkin Yu.D., Kuz'min B. P. *Praktika protivokorrozionnoi zashitu.* (Russian) 1998 (1), 35–38) An advantage of the present invention method is a higher rate of fluorination.

The present invention illustrates a new mechano-chemical method of Fluorination by using Fullerene Fluorination as a commercially significant example. The present invention improves upon the prior art by utilizing improved containers and balls, which have a special protective coating. A preferred embodiment of the present invention uses a coating such as WC, $W_{12}C$, diamond like coating, or Ni CVD film. In a general embodiment of the present invention, fullerenes and fluorine containing materials are mixed together with diluting materials such as $Al_2O_3$, $ZrO_2$, or $Y_2O_3$. This mixture and specially coated balls are placed within the specially coated container. The mechanical movement of the vibromill activates the reaction between the fullerenes and the fluorine containing materials.

In a preferred embodiment, the equipment for production of fullerene fluorides includes a vibromill (FIG. 1), a furnace for thermal treatment of materials in inert gases after milling, and an installation for vacuum distillation equipment or mass-spectrometer. The balls and containers are coated with an appropriate special coating to reduce corrosion and reduce contamination of products.

Figure 1:
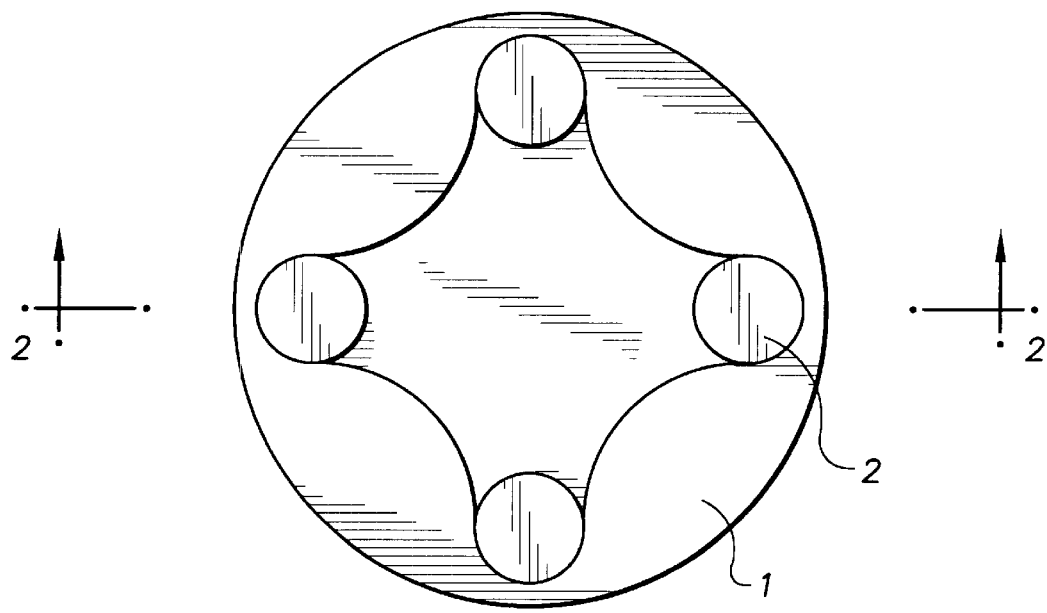
FIG. 1 shows a top view of a vibromill.
Figure 2:
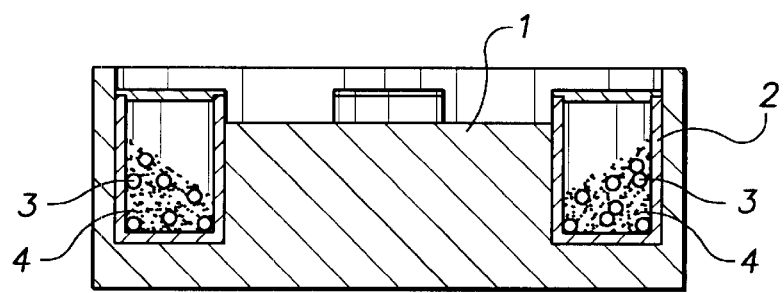
FIG. 2 depicts a cross sectional view of a vibromill.

The present invention applies not only new types of containers and balls, but also uses a new variety of fluorinating materials, catalysts and diluting substances. The application of different fluorides, change of frequency of milling, change in mass of balls, addition of coatings, and introduction of special catalysts, diluting agents and inert additives all lead to the synthesis of pure fluorides. This improved process is used to synthesize $C_{60}F_{18}$, $C_{60}F_{36}$, $C_{60}F_{48}$ and other similar substances. FIG. 1 depicts the vibromilling device for synthesis, which consists of a large container (diameter 90–100 mm) and four smaller containers inside the larger container.

In a preferred embodiment, the method of FF production is as follows. Fullerene is placed into specially coated container 2. Specially coated balls 3 are placed inside container 2 with mixture 4 of fullerenes and fluorine containing substances (such as $MnF_3$, $CeF_3$, $TbF_3$). Catalysts such as $NiF_2$, $FeF_2$ or $AlF_3$ are also added to intensify the fluorination process. Raw materials are milled for 5 to 10 min. in a pulse regime. Pulse regime energy is applied by alternating on/off power supply to the equipment. In this preferred embodiment the pulse regime has a ratio of milling operation time to power off time of between 1:2 and 2:1.

The interval between the milling operations is preferably between five and ten minutes. The milling sequence continues for a suitable amount of time depending on the chosen fluorine containing substance. The power setting for vibromilling is 40–60 W/g, and the frequency is set for 50–60 Hz. For optimal results, it is necessary to chill containers 2 during the vibromilling process. Vibromilling triggers the mechanical activation process between fullerene and fluorine containing materials. Alternatively, diluting agents such as $Al_2O_3$, $ZrO_2$ or $Y_2O_3$ are added as well to decrease the thermodynamic activity of fluorine containing reagents. Addition of these substances allows different fluorine fullerenes to be obtained that follow the formula $C_{60}F_x$. In this equation, the variable x is a function of fluorine activity, temperature, and the time of milling and reaction.

After milling is complete, the resulting substances are heated up to between 200–400° C. for duration of 1–10 hours. The heating process is carried out in the presence of inert gases such as $N_2$, Ne or Ar. Alternatively the heating process is carried out in a diluted fluorine containing gas mixture of 1 part fluorine to 10–20 parts of inert gas. After the heating time is complete, balls 3 should be separated from the materials and decomposition products of fluorine containing mixture 4. The resulting mixture of FF ($C_{60}F_{48}$, $C_{60}F_{36}$, $C_{60}F_{18}$, etc.) is then separated into individual substances. This can be achieved by means of either mass spectrometry or vacuum distillation for 15 hours at temperatures between 150 and 350° C. and a vacuum of at least $10^{-7}$ torr. In the experiments, all FF compositions have been identified using Knudsen and Laser mass-spectrometry and Fourier transform infrared spectroscopy (FTIR).

The present invention is further illustrated by the following examples, but is not limited thereby. The following examples are distinguished from the prior by an increase in yield and end product purity.

EXAMPLE 1

$C_{60}$—7 g, $MnF_3$—15 g
Vibromilling time—2 h 40 min
Conventional vibromill: diameter of container—85 mm; 7 balls with diameter 8 mm
Coating: Ni-CVD on container walls and balls
Heat in $N_2$ atmosphere—10 hours; temperature=150° C.
Distillation of mixture FF in vacuum: $10^{-9}$ torr for 15 hours
Yield=75% and purity=98.1% of $C_{60}F_{36}$

EXAMPLE 2

$C_{60}$—5 g, $CeF_4$—18 g
Vibromill time—2 hours 10 min;
Conventional vibromill, diameter of container—85 mm; 7 balls with diameter 8 mm
Coating: WC on container walls and balls
Heat in Ne for 5 hours; temperature=210° C.
Vacuum distillation $10^{-9}$ torr
Yield=77% and purity=98.2% of $C_{60}F_{36}$

EXAMPLE 3

$C_{60}$—5 g, $TbF_4$—12 g
Vibromilling time—2 h 50 min
Vibromill: diameter of container—85 mm; 7 balls with diameter 8 mm
Coating $W_{12}C$ on container walls and balls
Heat in $N_2$—8 hours; temperature=210° C.
Yield=73% and purity=98.3% of $C_{60}F_{36}$

EXAMPLE 4

$C_{60}$—5.5 g, $CoF_3$—12.5 g
Vibromilling time: 1 h 40 min
Vibromill: diameter of container—85 mm; 7 balls with diameter 8 mm
Coating: diamond-like coating film on container walls and balls
Heat in $N_2$—8 hours; temperature=210° C.
Yield=79% and purity=98.2% of $C_{60}F_{36}$

EXAMPLE 5

$C_{60}$—4 g; $K_2NiF_6$—14 g
Vibromilling time: 2 h 40 min
Vibromill: diameter of container—85 mm; 7 balls with diameter 8 mm
Coating: Ni-CVD on container walls and balls
Heat in Ar—8 hours; temperature=210° C.
Yield=69% and purity=98.4% of $C_{60}F_{36}$

EXAMPLE 6

$C_{60}$—5 g; $K_2PtF_6$—7 g
Vibromilling time: 2 h 10 min
Vibromill: diameter of container—85 mm; 7 balls with diameter 8 mm
Coating: Ni-CVD on container walls and balls
Heat in $N_2$—8 hours; temperature=210° C.
Yield=70% and purity=98.2% of $C_{60}F_{36}$

EXAMPLE 7

$C_{60}$—7 g; $Fe_2F_3$—15 g
Vibromilling time: 3 h 40 min
Vibromill: diameter of container—85 mm; 7 balls with diameter 8 mm
Coating: WC on container walls and balls
Heat in $N_2$—12 hours; temperature=210° C.
Yield=71% and purity=98.3% of $C_{60}F_{36}$

EXAMPLE 8

$C_{60}$—16 g; $MnF_3$ 1.8 g
Vibromilling time: 1 h 40 min
Vibromill: diameter of container—85 mm; 7 balls with diameter 8 mm
Coating: WC, DLC-film, or NI-CVD film on container walls and balls
Heat in $NE/F_2$ (1:10 ratio) for 10 hours; temperature=330° C.
Yield=72% and purity=98.3% of $C_{60}F_{36}$

EXAMPLE 9

$C_{60}$—100 mg; $MnF_3$—700 mg; $ScF_3$—900 mg
Milling time: 25 min
Coating: Ni-CVD film on container walls and balls
Heat in $F_2$/He (1:8 ratio) for 40 min; temperature=370° C.
Yield=80% and purity=98.0% of $C_{60}F_{36}$ of $C_{60}F_{36}$
Total reaction time—8 hours

EXAMPLE 10

$C_{60}$—100 mg; $K_2NiF_6$—400 mg; $NiF_2$—100 mg
Milling time: 35 min
Heat in $F_2$/Ne (1:10 ratio) for 45 min; temperature=375° C.
Yield 75% of 98.5% purity of $C_{60}F_{36}$
Total reaction time—9 hours

EXAMPLE 11

$C_{60}$—100 mg; $CoF_3$—800 mg; $YF_3$—1000 mg
Milling time: 50 min
Heat in $F_2$/Ar (1:12 ratio) for 35 min; temperature=375° C.
Yield 70% of 98.1% purity of $C_{60}F_{36}$
Total reaction time—9 hours Having described preferred embodiments of the invention with reference to the accompanying drawings, it is to be understood that the invention is not limited to the precise embodiments, and that various changes and modifications may be effected therein by skilled in the art without departing from the scope or spirit of the invention as defined in the appended claims.

What is claimed is:

1. A method of forming fluorinated species by mechano-chemical fluorination comprising the steps of:

placing reaction materials within mechano-chemical reaction equipment, wherein said mechano-chemical reaction equipment has an internal container and components which have special protective coatings, which resist the effects of fluorine, and wherein said special protective coatings are chosen from the group: WC, $W_{12}C$, Diamond-like Carbon films, and Chemical Vapor Deposited Ni;

introducing mechanical energy to initiate a mechano-chemical reaction; and forming desired fluorinated species from said reaction materials mixture.

2. A method according to claim 1, comprising an additional step of:

adding a catalyst to said reaction materials mixture prior to said mechano-chemical reaction step.

3. A method according to claim 1, comprising an additional step of:

adding a diluting agent to said reaction materials mixture before said mechano-chemical reaction step.

4. A method according to claim 1, comprising an additional step of:

chilling/cooling said container during said mechano-chemical step.

5. A method according to claim 1, wherein said step of introducing mechanical energy to initiate said mechano chemical reaction is performed in a pulse regime and said pulse regime having a ratio of milling operation time to power off time of between about 1:2 and 2:1.

6. A method according to claim 1 further comprising steps of:

heating said container subsequent to said mechano-chemical reaction step; and raising said mixture to a temperature between 200–400° C. and holding it for a period of 1–14 hours.

7. A method according to claim 6 further comprising a step of:

introducing an inert gas into said container prior to said heating step.

8. A method according to claim 7 wherein said inert gas is selected from the group: $N_2$, Ne, He and Ar.

9. A method according to claim 7 further comprising:
introducing a fluorine containing gas mixture prior to said heating step wherein said gas mixture has a ratio of fluorine gas to said inert gas between 1:10 and 1:40.

10. A method according to claim 1, wherein said desired fluorinated species are Fullerene Fluorides formed by reacting various fullerene and fluorine containing materials and wherein said mechano-chemical reaction process results in a FF mixture.

11. A method according to claim 10 wherein;
said mechano-chemical reaction process is a vibromilling process,
said fullerene and fluorine containing materials are vibromilled by means of metal balls,
said metal balls and internal container are fabricated with said special protective coatings which resist the effects of fluorine, and
said balls are separated from said FF mixture and products of decomposition subsequent to said vibromilling step.

12. A method according to claim 10 wherein a catalyst is added to said fullerene and fluorine containing materials before said mechano-chemical step to intensify the fluorination process.

13. A method according to claim 12 wherein said catalyst is selected from the group: $NiF_2$, $FeF_2$, and $AlF_3$.

14. A method according to claim 10 wherein diluting agents are added to said fullerene and fluorine containing materials before said mechano-chemical step.

15. A method according to claim 14 wherein said diluting agents are selected from the group: $Al_2O_3$, $ZrO_2$, and $Y_2O_3$.

16. A method according to claim 10, wherein said fluorine containing material includes at least one of the following compounds; $MnF_3$, $CeF_3$, $FeF_3$, $CoF_3$, $XeF_2$, $ClF$, $TbF_3$, $TbF_4$, $K_2PtF_6$ and $K_2NiF_6$.

17. A method according to claim 10, comprising an additional step of:
separating said FF mixture into individual substances by means of vacuum distillation for 15 hours at a temperature up to 150° C. and with vacuum of at least $10^{-7}$ torr.

18. A method according to claim 17, comprising a further step of:
verifying all FF compositions by means of mass spectrometry.

19. A method according to claim 10, comprising a further step of:
separating said resulting FF mixture into individual substances by means of preparative mass spectrometry.

20. A method according to claim 10, wherein said FF mixture comprises fluorinated fullerenes each following the formula $C_{60}F_x$, where the respective X's are integers determined by fluorine activity, temperature, and time of milling and reaction.

* * * * *